(12) United States Patent  
Vanderwende et al.

(10) Patent No.: US 7,383,169 B1  
(45) Date of Patent: Jun. 3, 2008

(54) METHOD AND SYSTEM FOR COMPILING A LEXICAL KNOWLEDGE BASE

(75) Inventors: Lucretia H. Vanderwende, Redmond, WA (US); Stephen D. Richardson, Redmond, WA (US); Karen Jensen, Bellevue, WA (US); George E. Heidorn, Bellevue, WA (US); William B. Dolan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/227,247

(22) Filed: Apr. 13, 1994

(51) Int. Cl.
*G06F 17/27* (2006.01)

(52) U.S. Cl. .................................. 704/9

(58) Field of Classification Search ............ 364/419.01, 364/419.08, 419.11; 704/9
See application file for complete search history.

(56) References Cited

U.S. PATENT DOCUMENTS 4,815,005 A * 3/1989 Oyanagi et al.
5,056,021 A * 10/1991 Ausborn ................ 364/419.08

OTHER PUBLICATIONS

Amsler, *The Structure of the Merriam-Webster Picket Dictionary*, Dec. 1980, pp. 1-163.
Atkins et al., "Explicit and Implicit Information in Dictionaries," *Proceedings of the Second Annual Conference of the University of Waterloo Centre for the Oxford English Dictionary: Advances in Lexicology*, 1986, pp. 45-63.

Boguraev et al., "From Structural Analysis of Lexical Resources to Semantics in a Lexical Knowledge Base," Position paper for Workshop on Lexicon Acquisition (IJCAI, Detroit, 1989), not published in proceedings, 16 pages.
Calzolari, "Detecting Patterns in a Lexical Data Base," *Proceedings of COLING84*, 1984, pp. 170-173.
Chodorow et al., "Extracting Semantic Hierarchies From A Large On-Line Dictionary," *Proceedings of the 23rd Annual Meeting of the Association for Computational Linguistics*, Jul. 1985, pp. 299-304.
Dahlgren, *Naive Semantics for Natural Language Understanding*, Kluwer Academic Publishers, Norwell, MA, 1988, pp. 1-258.
Grishman et al., "Acquisition of Selectional Patterns," *Proc. of COLING-92*, Nantest, Aug. 23-28, 1992, pp. 658-664.
Jensen et al., "Disambiguating Prepositional Phrase Attachments by Using On-Line Dictionary Definitions," *Computational Linguistics*, vol. 13, Nos. 3-4, Jul.-Dec. 1987, pp. 251-260.
Jensen, "A Broad-Coverage Natural Language Analysis System," *Current Issues in Parsing Technology*, Chapter 17, Kluwer Academic Publishers, 1991, pp. 261-276.
Klavans et al., "From Dictionary to Knowledge Base via Taxonomy," *Proceedings of the 4th Annual Conference of the University of Waterloo Centre for the New Oxford English Dictionary: Electronic Text Research*, 1990, pp. 110-132.

(Continued)

*Primary Examiner*—Joseph Thomas
(74) *Attorney, Agent, or Firm*—Klarquist Sparkman, LLP

(57) ABSTRACT

A lexical knowledge base is compiled automatically from a machine-readable source (such as an on-line dictionary or unstructured text). The preferred embodiment of the invention makes use of "backward linking," by which inverse semantic relations are discerned from the text and used to augment the knowledge base. By this arrangement, on-line dictionaries and other texts can provide formidable sources of "common sense" knowledge about the world.

30 Claims, 4 Drawing Sheets

OTHER PUBLICATIONS

Lenat et al., *Building Large Knowledge-Based Systems: Representation and Inference in the Cyc Project*, Addison-Wesley Publishing Company, Inc., 1989, pp. 1-372.

Markowitz, et al., "Semantically Significant Pattersn In Dictionary Definitions," *Proceedings of the 24th Annual Meeting of the ACL*, 1986, pp. 112-119.

Miller et al., "Introduction to WordNet: An On-line Lexical Database," *International Journal of Lexicography*, vol. 3, No. 4, Oxford University Press, 1990, pp. 235-244.

Montemagni et al., "Structural Pattersns vs. String Patterns for Extracting Semantic Information from Dictionaries," *Proceedings of COLING92*, 1992, pp. 546-552.

Pustejovsky et al., "Lexical Semantic Techniques for Corpus Analysis," *Computational Linguistics*, vol. 19, No. 2, pp. 331-358, 1993.

Ravin, "Disambiguating and Interpreting Verb Definitions," *Proceedings of the 28th Annual Meeting of the ACL*, 1990, pp. 260-267.

Velardi et al., "How to Encode Semantic Knowledge: A Method for Meaning Representation and Computer-Aided Acquisition," *Computational Linguistics*, vol. 17, No. 2, pp. 153-170, 1991.

Veronis et al., "Large Neural Networks for the Resolution of Lexical Ambiguity," GRTC/CNRS Technical Report No. 593, Feb. 1993, 21 pages.

Wilks et al., "A Tractable Machine Dictionary as a Resource for Computational Semantics," *Computational Lexicography for Natural Language Processing*, London: Longman Group, 1989, pp. 193-228.

Alshawi, H., "Analysing the Dictionary Definitions," *Computational Lexicography for Natural Language Processing*, ed. B.K. Boguraev and E.J. Briscoe, 153-170, London: Longman Group, 1989.

Basili, R., M.T. Pazienaz, and P. Velardi, "Combining NLP and Statistical Techniques for Lexical Acquisition," *Proceedings of AAAI Fall Symposium Series: Probabilistic Approaches to Natural Language*, Oct. 23-25, 1992, pp. 1-9, 1992.

Greffenstette, G., 1992, "Finding Semantic Similarity in Raw Text: the Deese Antonyms," *Proceedings of aAAI Fall Symposium Series: Probabilistic Approaches to Natural Language*, Oct. 23-25, 1992, pp. 61-65, 1992.

Hearst, M.A., "Automatic Acquisition of Hyponyms from Large Text Corpora," *COLING92*, pp. 539-545, 1992.

Montemagni, S., "Tailoring a Broad-Coverage Grammar for the Analysis of Dictionary Definitions," *EURALEX æ92: Papers Submitted to the 5th International Euralex Congress on Lexicography*, 1992.

Lenat, "Steps to Sharing Knowledge," *Towards Very Large Knowledge Bases*, IOS Press, 1995, pp. 3-6.

Guha et al., "Cyc: A Mid-Term Report," *MCC Technical Report Number ACT-CYC-134-90*, Mar. 1990, 44 pages.

Berg-Cross, "Can a Large Knowledge Base Be Built By Importing and Unifying Diverse Knowledge?: Lessons From Scruffy Work," *Knowledge-Based Systems*, vol. 5, No. 3, Sep. 1992, pp. 245-254.

Guha et al., "Cyc: A Mid-Term Report," *AI Magazine*, 1990, pp. 45-86.

\* cited by examiner

METHOD AND SYSTEM FOR COMPILING A LEXICAL KNOWLEDGE BASE

FIELD OF THE INVENTION

The present invention relates to the field of natural language processing (NLP), and more particularly relates to a method and system for compiling a lexical knowledge base useful in such processing.

BACKGROUND AND SUMMARY OF THE INVENTION

Most semantic knowledge which is required in Natural Language Processing (NLP) or, e.g., in Artificial Intelligence (AI), has had to be built by hand, or hand-coded. Because the task of hand-coding semantic knowledge is time-consuming, these applications have necessarily been limited to a specific domain. In order to achieve true broad-coverage NLP, i.e., NLP unrestricted in domain, detailed semantic knowledge is required for tens, and hundreds, of thousands of words, including those which are infrequent, technical, informal, slang, etc. Constructing such semantic knowledge by hand as required in NLP, and possibly AI, is a significant problem. The problem is: how to acquire the semantic knowledge required for an unrestricted domain.

There have been some attempts to hand-code highly structured semantic knowledge for unrestricted NLP: Dahlgren (1988); Lenat and Guha (1989); and Miller et al. (1990). These attempts all demonstrate that to construct a semantic knowledge base by hand is extremely difficult. While it may be relatively simple to make decisions about how to capture words representing concrete concepts, to adequately capture the meaning of more abstract words can be much more problematic, involving difficult and sometimes arbitrary decisions about what semantic properties of a concept might be relevant. Frequently, representing some problematic concept or word can force wholesale changes in the ontology or in the set of semantic features which are assumed.

There have been some attempts to build a knowledge base using statistical information to acquire the semantic properties of words from large corpora: Basili et al. (1992); Grefenstette (1992); Grishman and Sterling (1992); Hearst (1992) and Pustejovsky et al (1993). Currently, however, none of these techniques appears capable of providing the semantic detail required for processing unrestricted text.

Our method is rooted in the tradition which attempts to construct a semantic knowledge base by identifying and extracting semantic information from a machine-readable version of a published dictionary (henceforth "on-line dictionary"). One of the earliest efforts in this general approach, which we will call dictionary-based, or DB, is Amsler (1980), which explored the possibility of constructing taxonomies (one type of semantic information) using computational methods. Although most of the ideas represented in this work were not actually implemented, this dissertation foreshadowed many of the issues which continue to confront researchers in computational lexicography. Chodorow et al. (1985) relied on string-matching to automatically extract genus terms for nouns and verbs from the on-line version of Webster's Seventh New Collegiate Dictionary (Webster 7). Markowitz et al. (1986) expanded on this general approach by attempting to discover "defining formulæ" or "significant recurring patterns" in the text of definitions—that is, syntactic or lexical patterns which appear to have been used in a consistent way by lexicographers to express a specific semantic relationship. In addition, Calzolari (1984, 1988) used string matching procedures in order to extract both genus and differentiæ information from the text of dictionary definitions.

More recently, semantic information has been extracted from on-line dictionaries in a two-step procedure, first parsing the dictionary text (the definition and/or example sentences); and then applying patterns to this syntactic information in order to improve the accuracy of the identification of semantic information. The first work of this kind was Jensen and Binot (1987), which involved parsing dictionary definitions using the PLNLP Grammar and then searching the resulting parse trees for combinations of syntactic and lexical features which could be reliably associated with semantic relationships like Part_of and Instrument as well as genus terms. Jensen and Binot show how the results of this extraction procedure can effectively help resolve the kinds of prepositional phrase attachment ambiguities encountered in free text. Related work includes Klavans et al. (1990), Ravin (1990), Verlardi et al (1991) and Montemagni and Vanderwende (1992). Montemagni (1992), meanwhile, shows that this same general methodology can be used to acquire semantic information from on-line dictionaries of Italian.

An interesting aspect of the research program begun by Jensen and Binot (1987), and continued in Jensen's later writings (see, e.g., Chapter 17 of Tomita, ed. (1991)) is its claim that dictionary entries can be effectively analyzed by a parser designed for broad-coverage text analysis. (It will be understood that a parser is a software tool that takes a text string and produces a structure corresponding thereto.) In contrast, work such as Alshawi (1989) and Slator (in Wilks et al., 1989) have relied on specially-constructed parsers which exploit the idiosyncratic syntactic properties of LDOCE entries. The advantage of relying on a broad coverage parser is that the parser need not be modified or rewritten in the course of extending the approach to other dictionaries. We see this as an important consideration, given that the huge semantic resources needed for broad-coverage NLP can only be acquired through the merging of multiple on-line dictionaries, as well as the analysis of encyclopedias and other sources.

While extracting semantic information from the parsed definitions and/or example sentences for words in the dictionary produces some semantic information for those words, the level of semantic information still is not sufficient for processing unrestricted text. There are some researchers who claim that dictionaries are too impoverished a source of semantic information to ever serve as the lexical knowledge base for sophisticated semantic processing (e.g. Atkins, Kegl, and Levin, 1986). This pessimistic view seems to be supported by a casual examination of dictionary entries. Definitions frequently fail to express even basic facts about word meanings, facts which we would obviously want to include in a knowledge base which is to serve as the basis for understanding language. A typical case is the word "flower" in Longman Dictionary of Contemporary English (henceforth, LDOCE) whose primary sense is noteworthy more for the information it omits than for what it provides:

flower (n,1) "the part of a plant, often beautiful and coloured, that produces seeds or fruit"

Missing from this definition is any detailed description of the physical structure of flowers, information about what kinds of plants have flowers, and so on. Even the important fact that flowers prototypically have a pleasant scent goes unmentioned. We might, of course, try to increase our stock of information about this word's meaning by exploring the definitions of words used in its definition ("plant," "beautiful," etc.) in a way that is similar to the forward spreading activation in the networks of Veronis and Ide (1993). In this case, however, such a strategy is not especially productive, yielding general information about plants but no specific details about flowers. The question then remains: how to acquire the semantic knowledge required for an unrestricted domain.

To a great extent, the apparent inadequacy of on-line dictionaries for semantic processing can be attributed to the way in which they have been used—what we might term the forward-linking model of dictionary consultation. Given a dictionary in book form, the only way to find information about a given word involves looking it up, then exploring the semantic properties of any words mentioned in its definition, and so on. Once the data are available on-line, however, we exploit dictionary access strategies which involve not only forward-linking, but also backward-linking. That is, in looking up a word we might consult not just its own definition, but also the definition of any word which mentions it. This approach was explored in Amsler (1980) who made use of concordances, e.g. on the dictionary entry for the word "flower," a concordance was included of all of the words which mention the word "flower" in the definitions, e.g. "petal" and "rose." It is important to note, however, that a concordance of such terms does not make explicit the semantic relation, if any, which holds between the headword and a concordance term. As such, the presence of concordance terms for a headword does not augment the semantic information for that headword, nor does it facilitate any NL processing task, such as resolving syntactic ambiguity. Specifically, Amsler only explored discerning taxonomic information (hypernym, hyponym) from the concordances, which are of only limited use in NL processing. Amsler's concept was also cited by Chodorow et al. (1985) in developing a tool for helping human users disambiguate hyper/hyponym links among pairs of lexical items; again, however, this approach was limited to hypernym and hypernym_of semantic relations. Boguraev et al. (1989) discuss distributed lexical knowledge, in which the structure of each lexical entry is represented explicitly and the dictionary as a whole can be queried using a strategy of either query-by-example or unification. However, in Boguraev et al. (1989), the information that can be queried is only that which can be conveyed by the structure of a lexical entry, not the contents of either its definition and/or example sentences (they describe no method for extracting semantic information from the contents of the definition and/or example sentences). Moreover, as described in Boguraev et al. (1989), the distributed lexical knowledge can only be discovered by constructing queries manually, and it is described to be useful for the researcher who wants to acquire lexical information; this is in contrast to our system, which typically constructs a semantic knowledge base for consumption by a computer application, and is only incidentally useful to a researcher, and this knowledge base contains all of the relevant information pertaining to a lexical entry on that entry itself, so no query mechanism is required to associate the information which is found distributed in the on-line dictionary.

In accordance with the preferred embodiment of the present invention, a lexical knowledge base is compiled automatically from a machine-readable source, such as an on-line dictionary or unstructured text, obviating many of the drawbacks associated with the foregoing prior art techniques. The preferred embodiment of the invention makes use of "backward linking" by which inverse semantic relations are discerned and used to augment the knowledge obtained from traditional forward-linking analysis of the parsed text. Iteration of this technique can further enhance the results.

The foregoing and additional features and advantages of the present invention will be more readily apparent from the following detailed description thereof, which proceeds with reference to the accompanying drawings.

DETAILED DESCRIPTION

We now describe our use of DB methods to automatically create a semantic knowledge base from an on-line dictionary. Our approach builds on the work of Jensen and Binot (1987) and Montemagni and Vanderwende (1992), and extends it both in quantity and quality of information extracted.

Overview

Lexical knowledge is poorly characterized by even the best definition of a word. The foregoing example of the definition for "flower" amply proves the point. Humans, by virtue of their ability to understand a definition in the relational context of a well developed prior knowledge base, can intuitively compensate for many such definitional deficiencies. (They know, for example, that a flower has petals, even though the definition of "flower" doesn't say so.)

A feature of the present invention that seeks to redress this deficiency of each definition taken separately is the notion of "backward linking." In compiling lexical knowledge associated with the word "flower," for example, systems according to the preferred embodiment of the present invention do not rely just on the definition of "flower," nor on the definitions of terms used in the definition of "flower." Instead, such traditional definitional information is here augmented by information gleaned from other dictionary entries which use the term "flower" in their definitions. "Petal," "garden" and "rose" are but some of the rich variety of terms that are identified in this fashion. The contexts in which these associated terms are found are then heuristically analyzed to discern semantic relationships between each of these terms and the original word "flower." (It should be noted that not all definitions which mention "flower" will have a semantic relation with "flower" as the value.) This analysis reveals, for example, that "petal" is a part of a flower, "garden" is a location where flowers may be found, and "rose" is a type of flower. These terms, and their associated relations to "flower," are then stored as part of the lexical knowledge base for the term "flower."

Figure 1:
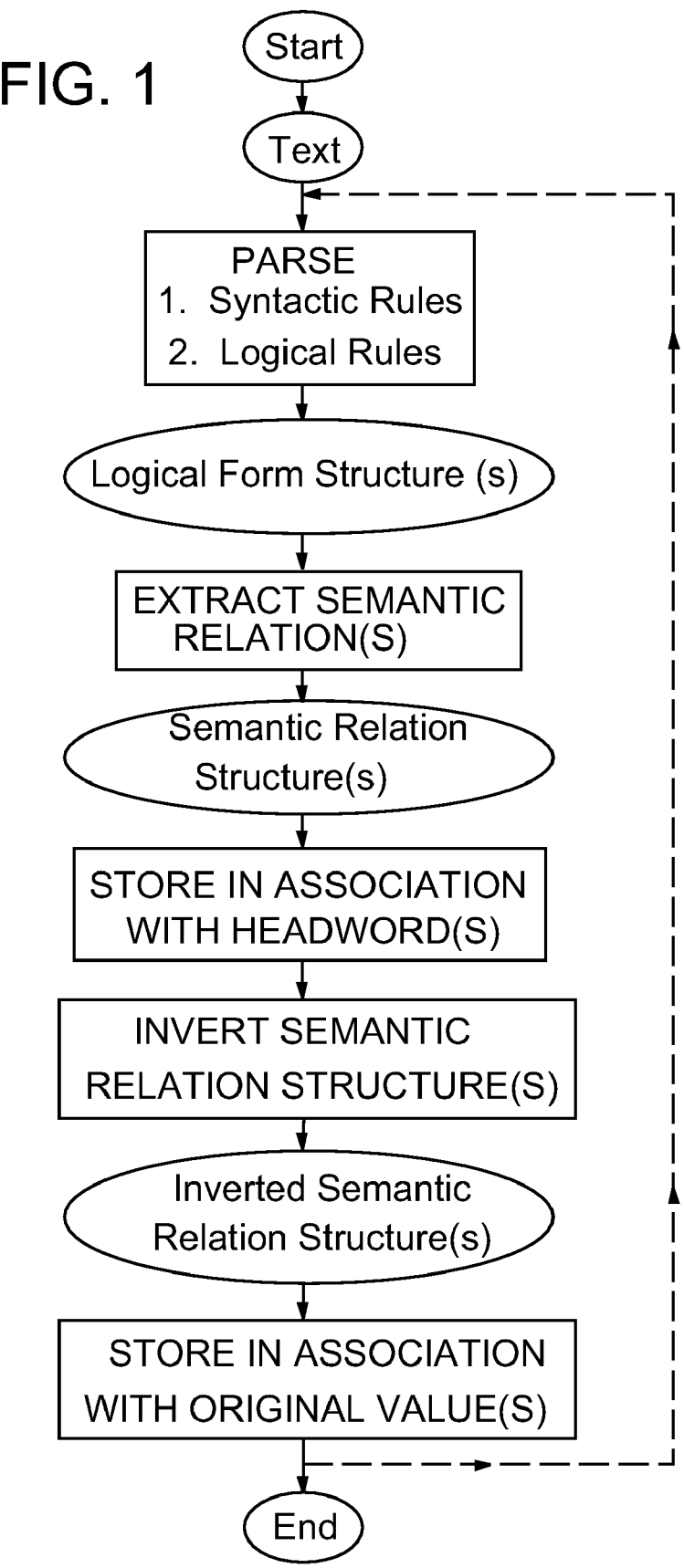
FIG. 1 is a flow chart illustrating a method for generating a lexical knowledge base according to one embodiment of the present invention.

While the foregoing paragraph illustrates the concept of "backward linking," it omits several of the other steps in our preferred embodiment. A more complete summary includes the following steps, illustrated in FIG. 1:

1. A text segment, which could be a dictionary definition, e.g. that for the first sense of "flower" (or a dictionary's example sentence, or other text relating to "flower") is parsed with a natural language parser to obtain a logical form. This step may entail two discrete substeps:
   a. A set of syntactic rules is applied to the text segment to produce a corresponding syntactic structure. This can be done using either a grammar designed specifically for the on-line dictionary being used, but more preferably involves the application of a broad-coverage grammar to the definition in order to facilitate processing multiple monolingual dictionaries. Such a broad coverage grammar is disclosed in Jensen (1986) and McCord (1993).
   b. A set of logical rules is applied to the syntactic structure to produce a corresponding logical form.

2. A semantic relation structure is then extracted from the logical form. This is done by the application of a set of heuristic rules—these serving to correlate particular syntactic and lexical patterns with corresponding semantic relations. The result is one or more semantic relations per text segment (e.g. a definition). These relations may have as their values either (a) word(s) or embedded relation(s). A simple semantic relation is composed of a triple including: (1) a headword (e.g. "flower"); (2) a semantic relation (e.g. "part of"); and (3) a value (e.g. "plant"). All of the semantic relations pertaining to a single text segment will collectively be called a semantic relation structure. (In practical implementation, semantic relation structures are often more complex than the simple <headword|relation|value> used in the foregoing example. More typically, rich tree structures are formed, with each value itself often being used as a headword, and associated with further relations and values.)

3. The semantic relation structure identified in this fashion is then stored in association with the headword "flower" as part of the lexical knowledge base.

So far, it should be noted that no backward linking has occurred. Instead, the steps have only been concerned with the original dictionary definition for the word "flower." Further, it should be noted that these steps, per se, are well known in the art, being found in many other NLP analysis systems (albeit not in the context of extracting semantic relations from the logical form of definitions in on-line dictionaries).

4. The foregoing process is repeated for each word defined in the dictionary.

5. The backward linking begins by inverting each of the semantic relation structures generated by the foregoing steps. For example, <flower|part of|plant> becomes <plant|part|flower> (the inverse of the semantic relation part of is part).

6. Each inverted semantic relation structure is then used to augment the lexical knowledge base. For example, the inverted structure <plant|part|flower> is used to augment the entry for "plant," thus making explicit the semantic knowledge that one of the parts of a plant is a flower. This knowledge, which originally was explicit only in the definition of "flower," is now explicit in the entry for "plant" as well. (Likewise, each of the inverted semantic relation structures that included "flower" as an original value is used to augment the knowledge base entry for "flower," thereby associating knowledge of relations with "petal," "garden," "rose," etc.)

7. After the knowledge base has been augmented with the inverted semantic relation structures, it is sometimes desirable to repeat the entire process. The augmentation of the knowledge base by the inverted semantic structures produced in the first pass of the process improves the parser's ability to produce unambiguous logical forms in subsequent passes. More meaningful semantic relations can thereby be found. (In the preferred methodology, the first pass seeks to extract one set of semantic relations [e.g. hypernym/hyponym], and the second pass seeks to extract a different set of semantic relations [e.g. location, location_of, part, part_of].)

The foregoing overview will become clearer from the following, more detailed, discussion of the component steps and their preferred implementation.

Parsing/Extracting

The first step in extracting information from lexical entries in a dictionary involves parsing the definition and/or example sentences using a broad-coverage grammar of English. The resulting parse structures are then subjected to a set of heuristic rules whose goal is to identify syntactic and lexical patterns which are consistently associated with some specific semantic relation.

A variety of techniques for effecting this analysis are known in the art; the one we prefer follows-the-teachings of Jensen and Binot (1987), as refined by the teachings of Montemagni and Vanderwende (1992), but without the post-processing described in section 5 of the latter paper. Furthermore, we recommend applying the structural patterns for identifying semantic analysis to an analysis of the text segment at the level of logical form instead of the less detailed level of syntactic analysis. An example of this analysis technique proceeds with reference to two sample definitions from the LDOCE:

| | |
|---|---|
| authority (n, 7): | a person, book, etc., mentioned as the place where one found certain information |
| storehouse (n, 1): | a place or person full of information |

In each of these definitions, a location relation holds between the headword (in boldface) and the word "information," despite the fact that this relation is expressed differently in each case. The patterns that make it possible to identify the underlying semantic similarity in these superficially different definitions can be roughly paraphrased as:
   if there is a relative clause and the relativizer is in the set {where, in which, on which}, then create a location relation using the verb of the relative clause and its arguments;
   if the genus term is in the set {place, area, space . . . } and there is a prepositional phrase containing the preposition of, then create a location relation using the noun of the PP, along with any of its modifiers.

Applying these patterns to the parsed definitions of "authority" and "storehouse" yields, in part, the fact that each is the location of "information." It is these patterns, together with the use of a NL parser (e.g. as described in Jensen, 1986), that enable the automatic extraction of vast numbers of semantic relations across the entire dictionary. (It should be noted that these structural patterns include the phrases: "and its argument" and "along with any of its modifiers." These phrases show a further improvement on the techniques of Montemagni and Vanderwende: in that paper, the patterns explicitly referred to the semantic relations which were to be extracted in embedded semantic relation structures, e.g. page 547, the pattern explicitly checks whether there is an Object or Subject attribute. In the presently preferred embodiment, the phrases "and its argument" and "and any of its modifiers" invokes a special pattern for verbs and for nouns, respectively. These special patterns extract further semantic relations based on the lexical and syntactic/logical form configuration of which the initial word to be extracted is the center. These special patterns allow very deep levels of embedding of semantic relations to be identified for all levels of the logical form analysis, notably because they apply recursively. This results in correspondingly deep semantic relation structures.)

Once extracted, these relations are explicitly added to the words from whose definitions they were obtained, thus creating a network of labeled links between words in the dictionary (i.e. the identified semantic relations serve as the links). Shown below are the semantic relations added to this sense entry for "authority."

authority (n,7): a person, book, etc., mentioned as the place where one found certain information

| authority | hypernym: | person |
| authority | hypernym: | book |
| authority | location: | find |
| | | typical_object: information |

In this example, hypernym indicates an is_a relationship; the location relation has as its value the verb "find," which has its own semantic relation: typical_object, whose value is "information." A paraphrase of this semantic relation structure is "an authority is a person, an authority is a book, and an authority is a location where someone finds an object, typically 'information.'"

In our work, we have found it best to use a relatively small set of semantic relations. Our preferred system identifies just the following relations: cause, cause_of, degree, degree_of, domain, domain_of, hypernym, hypernym_of, location, location_of, manner, manner_of, material, material_of, means, means_of, part, part_of, possessor, possessor_of, purpose, purpose_of, role, role_of, synonym, time, time_of, typical_object, typical_object_of, typical_subject, typical_subject_of, user, and user_of. Of course in other embodiments, larger or smaller sets of relations can be used.

Further, our preferred implementation does not extract each of these relations in both the forward linking and backward linking operations. Instead, the relations hypernym, user, domain, and manner are extracted only in the forward linking operation, and the relations hypernym_of, user_of, domain_of, and manner_of are extracted only in the backwards linking operation.

Our method allows the following information to be extracted from the definition of "plant," and these semantic relations are added to this sense entry for "plant":

flower (n,1) "the part of a plant, often beautiful and coloured, that produces seeds or fruit"

| flower | part_of: | plant | |
| | subject_of: | produce | |
| | | typical_object: | seed |
| | | typical_object: | fruit |

A paraphrase of this set of semantic relations is "a flower is part_of a plant, and a flower produces objects, typically seeds and/or fruit." As mentioned above, this definition is noteworthy more for the information that it omits than for what it provides. Missing from this definition is any detailed description of the physical structure of flowers, information about what kinds of plants have flowers, and so on.

Backlinks

As noted, we have observed that most of the lexical information available in a dictionary for a given term is to be found in the entries for other words that mention that word, rather than in the entry for the term itself. For instance, it is relatively unusual to find words which describe the parts of some object in the lexical entry for that object; instead, the relationship between the words for these parts and the larger object is defined only in the lexical entries describing the components themselves. Consider again the case of flower, whose LDOCE entry provides relatively little information about what a flower is. A simple search through LDOCE for noun entries which mention flower in their definitions, however, will allow us to arrive at a much more detailed picture of its meaning. For instance, a number of words in LDOCE describe flower components (1), and others establish such facts as what time of year flowers bloom and are plentiful (2), that they prototypically have a pleasant smell (3), that bees collect nectar from them (4), that they can be put in a vase (5), that they are sold from a shop by a florist (6), and that they are rolled up until they open (7). It is further possible to compile an exhaustive list of flowers and flowering plants, a few of which are given in (8) (LDOCE contains scores of such entries). A partial listing of other words that use "flower" in their definitions follows:

| 1. corolla | "the part of a flower formed by the petals, usu. brightly coloured to attract insects" |
| petal | "any of the (usu. coloured) leaflike divisions of a flower" |
| stalk | "a long narrow part of a plant supporting one or more leaves, fruits, or flowers; stem" |
| style | "the rodlike part inside a flower which supports the stigma at the top" |
| 2. spring | "the season between winter and summer in which leaves and flowers appear" |
| summer | "the season between spring and autumn when the sun is hot and there are many flowers" |
| 3. attar | "a pleasant-smelling oil obtained from flowers, esp. roses" |
| fragrant | "having a sweet or pleasant smell (esp. of flowers)" |
| perfume$_1$ | "a sweet or pleasant smell, as of flowers" |
| perfume$_2$ | "(any of the many kinds of) sweet-smelling liquid, often made from flowers, for use esp. on the face, wrists, and upper part of the body of a woman" |
| sweet | "having a light pleasant smell, like many garden flowers" |
| 4. nectar | "the sweet liquid collected by bees from flowers" |
| 5. vase | "a container, usu. shaped like a deep pot with a rather narrow opening at the top and usu. made of glass or baked clay, used either to put flowers in or as an ornament" |

-continued

| | | |
|---|---|---|
| 6. florist | "a person who keeps a shop for selling flowers" | |
| 7. bud | "a young tightly rolled-up flower (or leaf) before it opens" | |
| 8. aconite | "any of various plants usually having blue or bluish flowers and poisonous qualities" | |
| alyssum | "a type of low-growing plant with yellow or white flowers" | |
| anemone | "a plant that produces many red, white, or blue flowers" | |
| asphodel | "a plant with white, yellow, or pink flowers" | |
| aster | "a garden flower with a bright yellow centre" | |
| azalea | "a type of bush with bright usu. strong-smelling flowers" | |

Based on our observation that a wealth of information about a particular word may be contained in the definitions of (and therefore in the semantic relations associated with) words that mention the word in question, we have further augmented our lexical knowledge base to include explicit "backlinks," which provide access to that seemingly hidden information. As noted, we believe that such links substantially improve the effectiveness of semantic processing in NLP. This is accomplished by dramatically increasing the relational context for a given word in the knowledge base and therefore increasing the likelihood that other words may be successfully related in a meaningful way to that word. (For some dictionaries, these backlinks are restricted to the words of the vocabulary used in the definitions and/or example sentences, such is the case for LDOCE. Other dictionaries have not limited the vocabulary used to express definitions and so there are no restrictions on the number of backlinks that are found processing these dictionaries.)

On-line dictionaries thus represent formidable sources of "common sense" knowledge about the world, a long sought-after resource in AI. In order to exploit this information, however, we must tease out the network structure which is implicit in the text of dictionary definitions.

The idea that dictionaries define a huge interconnected network underlies work by Plate (in Wilks et al., 1989), who used co-occurrence patterns between words in LDOCE to produce a graphically-displayed statistical measure of semantic relatedness. Similarly, Veronis and Ide (1993) describe how statistical techniques can be used to transform a portion of the Collins English dictionary into a weighted neural network. A drawback to both of these approaches, however, is that the networks which they produce reveal only that two words are statistically correlated with one another in a dictionary; no information about the semantic nature of this relationship is available and precisely the nature of the relationship is believed to be crucial to semantic processing in NLP.

Implementation of Backlinks

After a definition and/or example sentence has been parsed, the resulting parse structures are first subjected to a set of heuristic rules whose goal is to identify syntactic and lexical patterns which are consistently associated with some specific semantic relation, such as instrument or location. Once a semantic relation has been identified, it is added to the sense entry whose definition and/or example sentences has just been parsed. For example, when the headword "corolla" is being processed, first its definition is parsed and then the heuristic rules are applied. Below are shown some of the semantic relations which have been extracted from the parsed definition of "corolla"; these relations are added to this sense entry of "corolla":

corolla (n, 1) "the part of a flower formed by the petals, usu. brightly coloured to attract insects"

| | | |
|---|---|---|
| corolla | part_of: | flower |
| | purpose: | attract |
| | typical_object: | insect |

In addition, each relation is added in its inverted form to the entry for the word which is the value of that relation. For example, the first semantic relation extracted for the word "corolla" is: corolla part_of flower; we will now add this relation to the entry for the word which is the value of the relation, namely, "flower," in its inverted form. The inversion of the part_of relationship is the part relationship. The following semantic relation will be added to the entry for "flower":

flower part: corolla

Having processed the definition of "flower" and the definition of "corolla," the entry for "flower" now is the following:

flower (n,1) "the part of a plant, often beautiful and coloured, that produces seeds or fruit"

| | | |
|---|---|---|
| flower | part_of: | plant |
| | part: | corolla |
| | subject_of: | produce |
| | typical_object: | seed |
| | typical_object: | fruit |

In addition to adding the inverted semantic relation derived from "corolla" to the entry "flower," one can add to "flower" other information pertaining to "corolla," for example, the sense number of "corolla." Adding sense numbers wherever they are available produces the following entry of "flower":

| | | |
|---|---|---|
| flower | part_of: | plant |
| | part: | corolla |
| | sens_no: | n, 1 |
| | subject_of: | produce |
| | typical_object: | seed |
| | typical_object: | fruit |

The second semantic relation extracted for the word "corolla" is: corolla purpose attract. The inversion of the purpose relationship is the purpose_of relation, and so the following semantic relation will be added to the entry for "attract" (note that any semantic relations which are part of the value of the relation being inverted, i.e., lower level relations, are also added to the entry and that these additional relations are not inverted):

| | | |
|---|---|---|
| corolla | purpose: | attract |
| | | typical_object: insect |
| ↓ | | |
| attract | purpose_of: | corolla |
| | | sens_no: n, 1 |
| | typical_object: | insect |

Finally, this semantic relation is also added to the entry for the words which are the value of the lower level relations, in this example: "insect." For adding semantic relations to the words which are the value of lower level relations, all relations to the original headword must be inverted. The inversion of typical_object is typical_object_of, and the inversion of purpose is purpose_of. The following semantic relation is added to the entry for insect based on the information extracted from "corolla":

| corolla | purpose: | attract | | |
|---------|----------|---------|---------------|--------|
|         |          |         | typical_object: | insect |
| ↓       |          |         |               |        |
| insect  | typical_object_of: | attract | | |
|         |          |         | purpose_of:   | corolla |
|         |          |         | sens_no: n, 1 |        |

In this way, we have acquired the semantic information that "insects can be attracted" even though this information is not explicitly mentioned in the definitions and/or example sentences of either "insect" or "attract."

Second and Subsequent Passes

Certain semantic relations, most notably hypernym, can be extracted reliably in the first pass through an on-line dictionary. (A "pass" is here considered to mean the sequence of steps shown in solid lines in FIG. 1.) Other semantic relations, however, are more difficult to identify without an established knowledge base. A simple example may help illustrate the point. Consider the following definition of necklace:

necklace: a chain of gold

In the first pass, the hypernym relation between necklace and chain can readily be identified. However, the relation between "chain" and "gold" is more tricky. Given the definition's structure, it would appear that the semantic relation linking "chain" and "gold" is part_of (i.e. chain part_of gold); this, however, is not correct. The correct semantic relation between "chain" and "gold" is that of material.

To address this problem, we have found it advantageous to process the on-line dictionary a second time, making use of the knowledge base assembled in the first pass as an aid to parsing. After the first pass, for example, the knowledge base has assembled a collection of hypernyms for "gold." Among this collection is the word "material." Thus, in the second pass, gold can be recognized as a material, and the semantic relation linking "chain" and "gold" can thus be accurately identified as that of material rather than part_of.

Still further improvements in accuracy may be achieved by performing not just two passes, but three or more.

Figure 2:
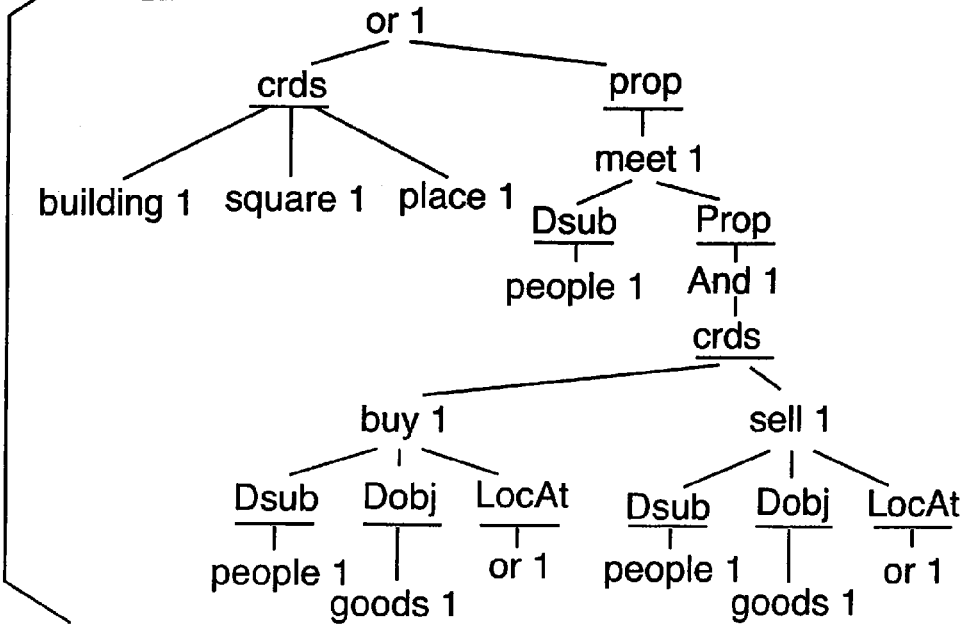
FIG. 2 is a logical form produced from a definition of the word "market" in accordance with one embodiment of the present invention.
Figure 3:
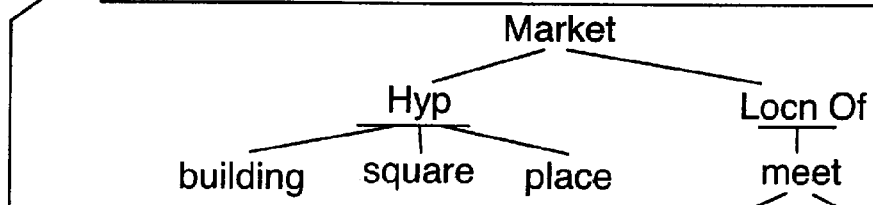
FIG. 3 is a semantic relation structure corresponding to the logical form of FIG. 2.
Figure 4:
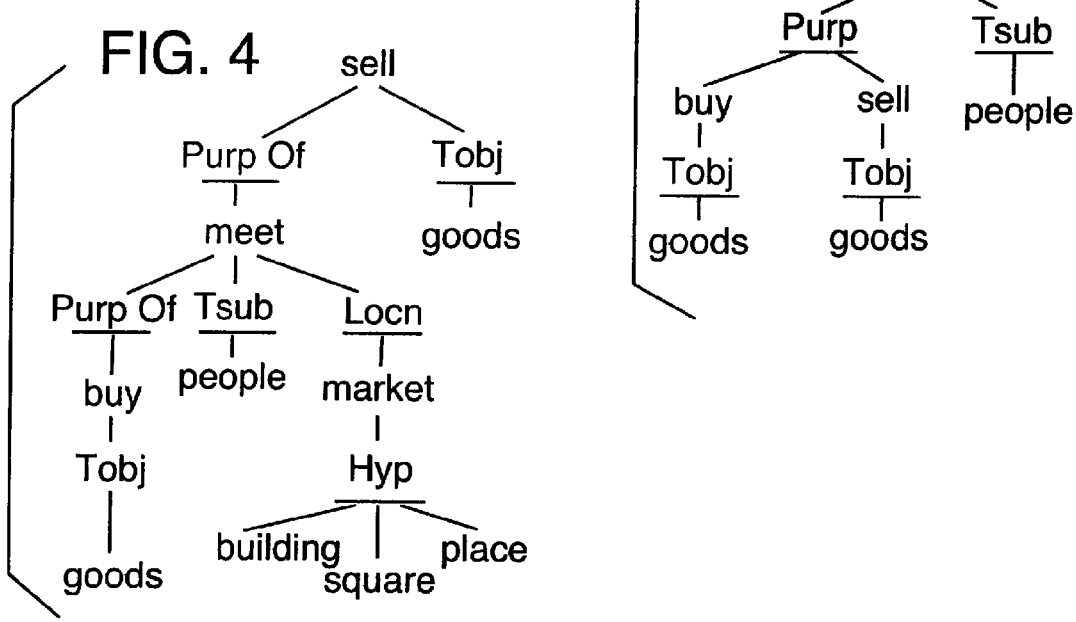
FIG. 4 is an inverted semantic relation structure derived from the semantic relation structure of FIG. 3.

FIGS. 2, 3 and 4

The sequence of steps, and the rich tree-like representations of the resultant logical form and semantic relation structures that can thereby develop, may be better appreciated by consideration of FIGS. 2, 3 and 4. This example proceeds with reference to the following definition for the term "market":

| market: | a building, square, or open place where people meet to buy and sell goods |
|---------|--------------------------------------------------------------------------|

After application of the syntactic and logical rules, the tree-like logical form of FIG. 2 results. In this representation, the terms followed by the number "1" denote words found in the definition being parsed (which definition is the first sense among the many senses defined in the dictionary). The underlined terms are deep case, or functional, roles, which here include deep subject (Dsub), deep object (Dobj), and located at (LocAt), as well as some structural attributes, such as coordinates (crds), and proposition (prop). (See Jensen, 1983, pp. 205-6, for a complete list.)

It will be noted that the structure may be viewed as circular in arrangement, with a link connecting the "or1" in the bottom right to the "or1" at the top of the diagram (link not here shown). Logical forms often exhibit such interconnectedness, revealing nuances of meaning not always apparent from the original text.

Next, the semantic relations are extracted from the logical form representation of FIG. 2, resulting in the semantic relation structure of FIG. 3. In this representation, the top headword is the term being defined, "market." The next level identifies the semantic relations extracted. One such semantic relation is that of hypernym (Hyp). This relation has three values, "building," "square" and "place." (That is, a market is a building; a market is a square; and a market is a place.) The other depicted semantic relation is that of location of (LocnOf). This relation has one value, namely "meet." (That is, a "market" is the location of "meet.")

The value "meet," however, is a headword itself as respects three further terms in the definition: "buy," "sell" and "people." The semantic relation structure reflects this relationship by further labelled links of purpose (Purp, for the values "buy" and "sell") and typical subject (Tsub, for the value "people"). Likewise, each of "buy" and "sell" is itself a headword, as reflected in the semantic relation structure by the further labelled semantic link of typical object (Tobj) between each and "goods." (In other words, "meet" has the purposes "buy" and "sell," both of which have a typical object of "goods," and finally, that "people" are the ones doing the "meet"ing.)

The semantic relation structure is thus typically a recursive tree structure, consisting of a top headword having one or more semantic relations, and each of these relations having one or more values. Not unusually, the values themselves can be headwords having one or more semantic relations to further values, etc.

The FIG. 3 structure is stored in association with the entry in the lexical knowledge base for the top headword (i.e. "market").

Next, the semantic relation structure of FIG. 3 is inverted and stored in the lexical knowledge base (together with every other semantic relation structure stored in the knowledge base). This step entails a 4 part procedure.

First, the semantic relation structure is traversed, adding the corresponding inverse semantic relation (where there is already an existing semantic relation) between each value and its headword.

Next, the semantic relation structure is traversed again, and at each node (i.e. value/headword), the semantic relation structure is output to a file, making that node the top headword in the semantic relation structure. This is accomplished by starting at the new top headword node and traversing, in a top-down manner, the semantic relation links (original or inverse, depending on the direction) to other nodes as needed to output the structure.

The inverted semantic relation structures in the output file are then sorted by the top headword of each structure.

Finally, the inverted semantic relation structures are stored in the lexical knowledge base on the entries for the top headword of each structure.

FIG. 4 illustrates the result of this inversion process for the term "sell" (which is stored on the entry "sell" in the lexical knowledge base). The semantic relations defined by this structure are described as follows: "sell" is the purpose of "meet," which also has the purpose "buy," "people" are the ones "meet"ing, "market" is the location of "meet," "market" has hypernyms "building," "square," and "place," and "goods" are the typical object of both "sell" and "buy."

Note that in this example, there are 9 possible inverted semantic relation structures for the original structure (one for each of the headwords/values in the original structure, not including the original top headword).

In the preferred embodiment, the headwords/values in the semantic relation structures may be sense disambiguated, i.e. they may each have an indication of the dictionary sense of the word they denote.

Example: "Book"

The knowledge base resulting from the foregoing process can be viewed as a huge, directed graph whose nodes correspond to headwords and senses. These nodes are interconnected by arcs labeled with semantic relations. A small fragment of the graph surrounding the word "book" is shown in Dolan et al. (1993).

The following example is part of the lexical knowledge base entry for "book" which results from application of our method to the LDOCE dictionary. (For the sake of legibility, we omitted most of the 173 top-level relations linking LDOCE headwords to "book.") The dictionary entry from which the semantic information was derived is indicated by "<" followed by the word and its sense number; for example, the first semantic relations "book Hyp word" and "book Part Of play" is derived from the 111 sense entry of "book," while the relation "book PurpOf alcove" is derived from the first sense entry of the word "alcove."

(Hyp=Hypernym, HypOf=Hypernym_of (also=Hyponym), PartOf=Part_of, TsubOf=Typical_subject_of, TobjOf=Typical_object_of, Tsub=Typical_subject, Tobj=Typical_object, PurpOf=Purpose of, Purp=Purpose, LocnOf=Location_of, Locn=Located_at, Syn=Synonym)

```
book
    book < book111
        Hyp         word
        PartOf      play
    book < book113
        Hyp         book
        TsubOf      list
            Tobj        numbers
    book < alcove1
        PurpOf      alcove
            Hyp         space
            PartOf      room
            Purp        bed
                        chair
    book < annotate1
        TobjOf      annotate
            Hyp         add
                Tobj        note
            Purp        explain
                Tobj        part
    book < annotation2
        Part        page
            LocnOf      annotation
                Hyp         note
    book < authority7
        HypOf       authority
            Hyp         person
            TobjOf      mention
            LocnOf      find
                Tobj        information
    book < bankbook1
        HypOf       bankbook
            LocnOf      keep
                Tobj        record
```

-continued

```
    book < bibliophile1
        TobjOf      love
            Tsub        bibliophile
                Hyp         person
    book < binder1
        TobjOf      bind
            Tsub        binder
                Hyp         person
    book < booklet1
        HypOf       booklet
            Syn         pamphlet
    book < bookseller1
        TobjOf      sell
            Tsub        bookseller
                Hyp         person
    book < bookworm1
        Part        paste
            TobjOf      eat
                Tsub        bookworm
                    Hyp         insect
                Tobj        binding
    book < bowdlerize1
        TobjOf      bowdlerize
            Hyp         remove
                Locn        book
                            play
    book < browse3
        LocnOf      browse
            Hyp         read
                Locn        book
            Purp        enjoyment
    book < browse3
        LocnOf      read
            HypOf       browse
```

Using the Semantic Knowledge Base

A semantic knowledge base constructed using the principles of the present invention not only improves the accuracy of natural language processing techniques known in the prior art; it also enables new analysis techniques not previously possible. Two examples, disambiguation and anaphora, are particularly discussed.

Disambiguation

A semantic knowledge base in this form allows a computer important new ways to explore the information available. In previous NLP applications which accessed a lexicon/knowledge base derived from an on-line dictionary, the computer program had access to the semantic information of the word under investigation (the forward-links) or it could access the lexical entries for the words identified as the hypernyms of the word under investigation.

For example, Jensen and Binot (1987) show how information automatically extracted from Webster 7 entries can be used to determine the proper attachment of ambiguous prepositional phrases. Consider the following text (1), in which the phrase "with bones" might plausibly be attached to either the verb "eat" or to "fish":

(1) I ate a fish with bones.

The relevant semantic information from Webster 7 that allows a heuristic to decide that "with bones" should be attached to "fish" is:

| (2) | bone (n, 1) | part_of | skeleton, vertebrate |
|---|---|---|---|
|  | fish (n, 1b) | hypernym | vertebrate |

Figure 5:
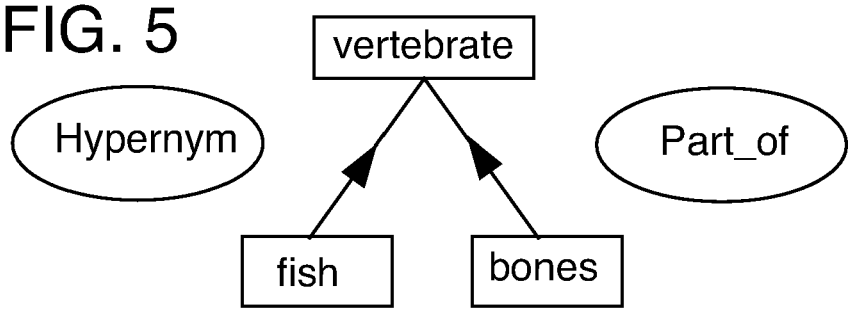
FIG. 5 is an illustration of an exemplary semantic network discussed in the specification.

The semantic network that allows this attachment to be made is shown in FIG. 5.

If we replace the word "fish" in this sentence with any of its hyponyms, such as "salmon," the heuristic above will fail to find any semantic association between this prepositional phrase and the noun it modifies:

(3) I ate a salmon with bones.

| (4) | bone (n, 1) | part_of | skeleton, vertebrate |
| | salmon (n, 1a) | hypernym | fish |

Figure 6:
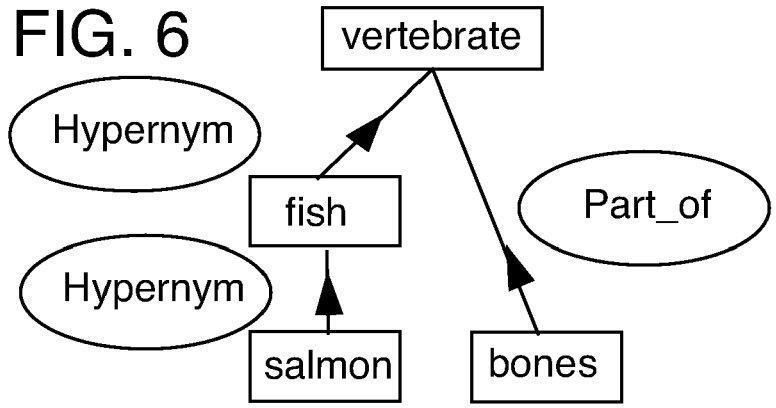
FIG. 6 shows the semantic network of FIG. 6 with elaboration.

Sometimes problems of this kind can be resolved by extending the search to include one or possibly two levels of hypernymy. For the sentence in (3) this will indeed solve the problem, since "salmon" has the hypernym "fish," "fish" has the hypernym "vertebrate," and, as we saw in (2), "bone" is known to be part of a "vertebrate." We can thus discover a complete path through the dictionary linking "bone" to "salmon," as shown in FIG. 6.

However, even if we allow such chains of hypernym links to be exploited in processing, this approach sometimes fails to discover what might intuitively be an obvious semantic connection between two words. For example, in (5), no match can be found at any level of hypernymy for the headwords "research" and "chapter."

(5) I researched the 19th century for this chapter.

Figure 7:
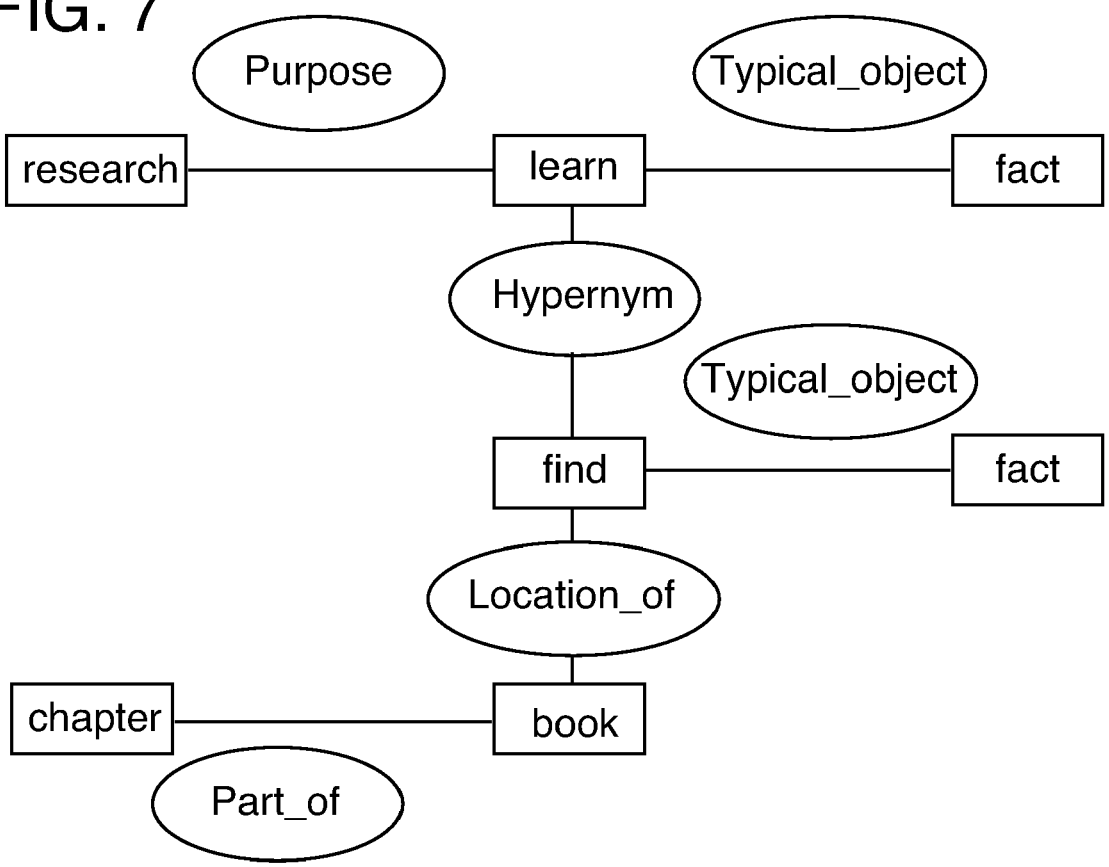
FIG. 7 is an illustration of another exemplary semantic network.

The prepositional phrase attachment in this sentence is unambiguous: any native speaker of English will infer first of all that writing/reading the chapter in question required researching the 19th century, and further, that the speaker is writing/reading a book. The apparent inability of a simple dictionary-based approach to provide evidence about whether the prepositional phrase "for this chapter" should modify "researched" or "the 19th century" thus represents an area in which enhancements according to the present invention are advantageous. Once the semantic knowledge base, as described above, has been constructed "research" and "chapter" can be linked, through "find" and through "book," which we know based on the definition of "authority" is the location of "finding." This is shown in FIG. 7.

The discovery of a sequence of links connecting two words in the network is crucially driven by evidence from the syntax of the input sentence. The preposition "for" in the prepositional phrase "for this chapter" will bias the system to prefer paths which link the verb "research" to "chapter" through a purpose relation.

The semantic knowledge base described here allows links between words to be discovered which use semantic information beyond hypernymy, or the semantic relations on the words in the input sentence. In the example above, for example, the link between "chapter" and "find" is found through a part_of relation between "chapter" and "book," and through a location_of relation between "book" and "find" (as discovered in the entry for "authority"). One might call the process which allows a link to be found between two words inference; the semantic knowledge base described here can be used for sophisticated inferencing, in unrestricted text, which makes use of any of the various semantic relations identified automatically in the definitions and/or example sentences in an on-line dictionary.

Anaphora

Another problem for which a rich semantic knowledge base provides a solution is that of anaphora: pronouns and definite noun phrase's referring back to some entity introduced earlier in the discourse. Sentences in a discourse are often linked by anaphora and it is important in any NLP or AI application to correctly identify the antecedent, i.e., the word which the anaphor points back to, (or forward to in the case of cataphora). An example of this kind is (6), where the word "chapter" in the first sentence implicitly introduces into the discourse both the larger concept "book" and, by extension, the related entities "bibliography" and "proofreading."

6. "I researched the 19th century for this chapter. The book is coming along really well, although it needs to be proofread and the bibliography is too long."

Our semantic knowledge base makes it possible to discover the links between these sentences, providing an explanation for the otherwise mysterious use of definite articles preceding "book" and "bibliography" in the second. The reason is that the word "chapter" in the first sentence invokes an entire schema of lexical items associated with "books":

| chapter | part_of | book |
| bibliography | part_of | book |
| proofread | typical_object | book |

Concluding Remarks

As is conventional in natural language processing, the present invention can be implemented using a variety of different computer systems. The one on which we did our work is a personal computer using an Intel 66 MHz 80486 microprocessor, running the Microsoft Windows 3.1 operating system. The software itself was coded in Microsoft's Visual C/C++, with portions written in a linguistic programming language called "G," whose statements are translated into "C" for compilation and execution. "G" is a variant of the PLNLP language described in Jensen (1993, PLNLP book). The storage of the lexical knowledge base is also conventional, and uses the entity-attribute-value type of data structure commonly used in databases. Preferably, each dictionary entry is divided into sense entries, each stored with its own set of semantic relations. The dictionary entries may be stored using any commonly available database system or file access method, preferably one that supports storing variable amounts of data with a given key which is indexed for direct access. In our implementation, we used a file access method which supports direct access of keys based on a binary search of a key index. The data stored with a key in our implementation may be arbitrarily long, thereby easily accommodating the main semantic relation structures stored in each keyed entry.

Figure 8:
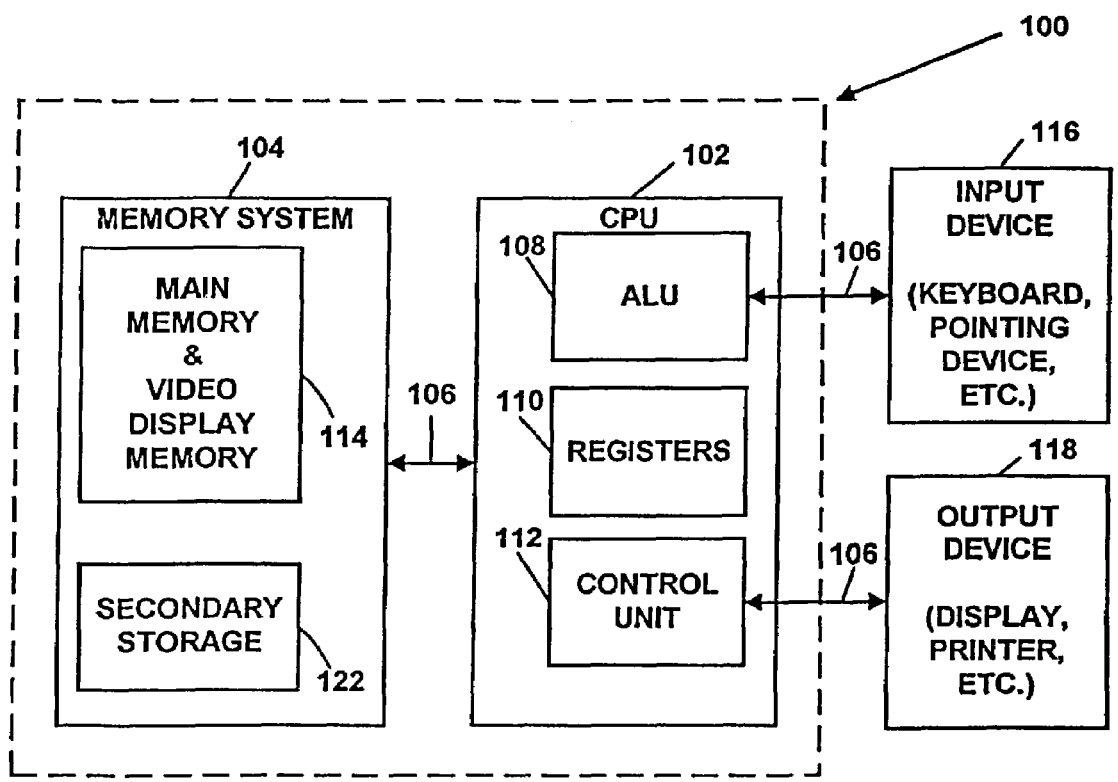

Referring to FIG. 8, as is familiar to those skilled in the art, a personal computer 100 of the sort referenced above includes a central processing unit (CPU) 102 and a memory system 104 that communicate through a bus structure 106. CPU 102 includes an arithmetic logic unit (ALU) 108 for performing computations, registers 110 for temporary storage of data and instructions, and a control unit 112 for controlling operation of the computer in response to instructions from a computer program.

Memory system 104 generally includes high-speed main memory 114 in the form of a medium such as random access memory (RAM) and read only memory (ROM) semiconductor devices. Main memory 114 stores programs such as a computer's operating system and currently running application programs. Main memory 114 also includes video display memory for displaying images through a display device 116. Memory system 104 further generally includes secondary storage 122 in the form of floppy disks, hard disks, or CD-ROM storage for long term mass storage.

Personal computer 100 further typically includes one or more input devices 118 and output devices 116. These are usually peripheral devices connected by bus structure 106 to CPU 102. Input device 118 can be a keyboard, mouse, or other device for providing input data to the computer. Output device 116 can be a display device, printer, or other device for providing output data from the computer.

Among the References Cited, we have provided citations to each of the works referenced in this disclosure, as well as several further works. In keeping with the maxim that a patent should not teach, but preferably omit, what is known in the prior art, we have not belabored the elements of our preferred implementation which borrow from this prior art. (We have, however, particularly cited certain prior art where it reflects our "best mode.") The reader who is not adequately versed in this field may wish to consult with the cited references to gain additional understanding.

We believe that when this method is applied to any number of dictionaries (or other texts), the resulting semantic knowledge base will be rich enough to support processing unrestricted text in NLP and to provide at least some of the common sense knowledge that AI requires.

The result of this processing is a significantly enlarged on-line version of a dictionary or combination of dictionaries. In one sense, what we have done is to formally structure, copy, and redistribute the semantic information throughout the set of entries. This process provides us with important new ways to explore the information which is available.

Having now described the principles of our invention with reference to exemplary methods and systems, it should be apparent that these examples can be modified in arrangement and detail without departing from such principles. For example although the invention has been described as using structured text—such as a dictionary—for the machine readable knowledge, in other applications unstructured text, such as an encyclopedia or other more general text, can be used. Similarly, while the invention has been described as extracting semantic relations by use of a parsing process, in other implementations other techniques can be used (e.g. string searching has been used for this purpose in the prior art).

Still further, while the preferred embodiment has been described as using a batch process to produce an unabridged, static, enhanced knowledge base (i.e. the entire dictionary is processed in one massive, multi-phase process), it will be recognized that this is not the only model in which the principles of our invention can be used. For example, in some applications it may be desirable to generate an enhanced knowledge base on an as-needed basis for selected term(s) out of the entire dictionary or other corpus. This approach is particularly well suited for applications in which the knowledge base is not based on a static source (i.e. a dictionary), but is based on a source that is continuously presented with new information. (Backlinking in such applications is more difficult, since the text has not typically been inverted and sorted. However, the terms of interest (i.e. "flower") can be identified throughout the corpus using well known string searching techniques, and the contexts (e.g. definitions) in which they are found can be processed and inverted to provide the requisite backlinked semantic relations.)

Yet further, it will be recognized that some semantic relations are more useful than others in subsequent use of the knowledge base. In a variation of the preferred embodiment, a weighting technique is used in which each semantic relation is assigned a relative weight based on its information value with respect to other semantic relations. Thereafter, NLP processing, such as disambiguation or anaphora resolution, can accord lower probability to links/inferences made using those relations assigned a low weight.

Those skilled in the art will recognize that knowledge bases produced according to the present invention will permit a large number of NLP and AI systems to overcome longstanding limitations. Rather than undertake an exhaustive listing of such situations, we note simply what may be the archetypical AI application: machine translation. Pursued since the 1950s, this dream of accurate machine translation has long been hindered by the absence of suitable knowledge bases. The present invention is believed to finally offer the promise of a solution to this problem.

In view of the wide variety of different applications to which the principles of our invention can be put, it should be recognized that the detailed methods and systems are illustrative only and should not be taken as limiting the scope of our invention. Instead, we claim as our invention all such modifications as may come within the scope and spirit of the following claims and equivalents thereto.

We claim:

1. A method for generating a lexical knowledge base in a memory of a machine, said generating comprising the steps:
   (a) parsing a segment of text to obtain a logical form corresponding thereto using a natural language parser associated with said machine;
   (b) using said machine to extract from the logical form at least one complex semantic relation structure, the complex semantic relation structure including at least a headword, a semantic relation, and a value; the value of said complex semantic relation structure including a primary value term, a lower level relation, and a lower level value term;
   (c) storing in the lexical knowledge base in said machine memory the complex semantic relation structure in association with the headword; and
   (d) augmenting the lexical knowledge base by:
      (1) inverting the semantic relation structure; and
      (2) storing in said memory, in association with the primary value term, the inverted complex semantic relation structure, said stored inverted complex semantic relation structure including the lower level relation and the lower level value term.

2. The method of claim 1 in which the natural language parser analyzes for at least 8 of the following semantic relations: part, part_of, typical_subject, typical_subject_of, typical_object, typical_object_of, purpose, purpose_of, location_of, located_at, and synonym.

3. The method of claim 1 in which the parsing and extracting steps include:
   (a) providing a natural language corpus:
   (b) analyzing the corpus by machine to identify a set of text segments therein;
   (c) automatically discerning from the text segments a first collection of complex semantic relation structures; and
   (d) storing data from the first collection of complex semantic relation structures as part of the lexical knowledge base;
   and in which the augmenting step includes:
   (e) inverting the first collection of semantic relation structures to yield a second collection of corresponding, inverted semantic relation structures; and
   (f) storing data from the second collection of corresponding, inverted semantic relation structures in said memory.

4. The method of claim 3 in which the parsing step includes string searching the corpus by machine to discern semantic relation structures.

5. A method for generating a lexical knowledge base in a machine, said generating comprising the steps:
(a) using a natural language parser associated with said machine to parse a segment of text to obtain a logical form;
(b) using said machine to extract from the logical form a semantic relation structure, the semantic relation structure including at least a headword, a semantic relation, and a value;
(c) storing in a memory associated with said machine the semantic relation structure in association with the headword in the lexical knowledge base; and
(d) augmenting the lexical knowledge base by:
 (1) inverting the semantic relation structure; and
 (2) storing, in association with the value, the inverted semantic relation structure.

6. The method of claim 5 in which the semantic relation structure includes at least one element in addition to a headword, a semantic relation, and a value.

7. The method of claim 6 in which:
the value of the extracted semantic relation structure includes a primary value term, a lower level relation, and a lower level value term; and
the augmenting of the lexical knowledge base includes storing in association with the primary value term the inverted semantic relation structure, said stored inverted semantic relation structure including the lower level relation and the lower level value term.

8. The method of claim 6 which includes providing an on-line dictionary from which the text is automatically parsed, the on-line dictionary providing a plurality of definitions for a given term, each of said definitions defining a sense of the term, said senses being numbered in the on-line dictionary, and in which the augmenting of the lexical knowledge base includes storing in association with the inverted semantic relation structure a dictionary sense number associated therewith.

9. The method of claim 6 in which the parser is a broad coverage parser.

10. The method of claim 6 in which the parsing step includes:
(1) applying a first set of rules to the segment of text to yield a syntactic structure corresponding thereto; and
(2) applying a second set of rules to the syntactic structure to produce the logical form.

11. The method of claim 5 which includes:
providing a natural language corpus;
using the machine to analyze the corpus to identify a collection of text segments therein;
performing steps (a)-(d) a first time on the identified text segments to produce an augmented lexical knowledge base, the augmentation of the knowledge base serving to enhance subsequent text parsing;
performing steps (a)-(d) a second time on the identified texts to further augment the knowledge base;
wherein the augmentation of the lexical knowledge base by the first performance of steps (c) and (d) enhances the parsing of the texts in the second performance of step (a).

12. The method of claim 11 which includes:
when performing step (b) the first time, extracting a first set of semantic relations; and
when performing step (b) the second time, identifying a second set of semantic relations, the second set of semantic relations being different from the first.

13. The method of claim 12 in which only the first set of semantic relations includes "hypernym."

14. The method of claim 12 in which only the first set of semantic relations includes "user," "domain" and "manner."

15. A machine-implemented method for generating a lexical knowledge base comprising the steps:
(A) using a computer to automatically process a text and identify at least a first semantic relation structure therein, said first semantic relation structure including at least four elements;
(B) using the computer to invert the first semantic relation structure to yield a second corresponding, inverted semantic relation structure; and
(C) storing data from the second semantic relation structure as part of a lexical knowledge base.

16. The method of claim 15 in which:
the identified semantic relation structure includes a headword, a primary relation, and a primary value;
the primary value includes a primary value term, a lower level relation, and a lower level value term; and
the storing includes storing in association with the primary value term the second semantic relation structure, said stored, second semantic relation structure including the lower level relation and the lower level value term.

17. The method of claim 15 which includes providing an on-line dictionary from which the text is parsed, the on-line dictionary providing a plurality of definitions for a given term, each of said definitions defining a sense of the term, said senses being numbered in the on-line dictionary, and in which the augmenting of the lexical knowledge base includes storing in association with the inverted semantic relation structure a dictionary sense number associated therewith.

18. The method of claim 15 in which the identifying step includes automatically parsing the text with a natural language parser, the parsing including:
applying a first set of rules to the text to yield a syntactic structure corresponding thereto;
applying a second set of rules to the syntactic structure to produce a corresponding logical form; and
extracting from the logical form said first semantic relation structure, said first semantic relation structure including at least a headword, a semantic relation, and a value.

19. The method of claim 18 in which the natural language parser analyzes for at least 8 of the following semantic relations: part, part_of, typical_subject, typical_subject_of, typical_object, typical_object_of, purpose, purpose_of, location_of, located_at, and synonym.

20. The method of claim 15 in which the identifying step includes string searching the text to discern semantic relation structures.

21. The method of claim 15 in which:
step (A) includes:
(a) providing a natural language corpus;
(b) analyzing the corpus by machine to identify a set of text segments therein;
(c) automatically discerning from the text segments a first collection of semantic relation structures; and
(d) storing data from the first collection of semantic relation structures as part of the lexical knowledge base;

step (B) includes:
(e) inverting the first collection of semantic relation structures to yield a second collection of corresponding, inverted semantic relation structures; and step (C) includes:
(f) augmenting the lexical knowledge base by storing data from the second collection of corresponding, inverted semantic relation structures.

22. The method of claim 21 which includes performing steps (a)-(f) a first time, the augmentation of the knowledge base resulting from performance of step (f) serving to enhance subsequent discernment of semantic relation structures, and then repeating steps (c)-(f) a second time; wherein augmentation of the knowledge base by the first performance of step (f) enhances the discerning of semantic relation structures by the second performance of step (c).

23. The method of claim 22 which includes discerning a first set of semantic relation structures in the first performance of step (c), and discerning a second set of semantic relation structures in the second performance of step (c), the second set of semantic relations being different from the first.

24. The method of claim 23 in which only the first set of semantic relations includes "hypernym."

25. The method of claim 23 in which only the first set of semantic relations includes "user," "domain" and "manner."

26. In a machine-implemented method of generating a lexical knowledge base comprised of using a computer to parse a collection of texts to identify semantic relation structures, and storing data from said semantic relation structures in the lexical knowledge base, an improvement comprising using the computer to iteratively parse the same collection of texts, successive parsings relying on successively enhanced versions of the lexical knowledge base, wherein semantic relations identified in one parsing operation serve to enhance discernment of semantic relations in subsequent parsing operations.

27. The method of claim 26 in which the iterative parsing includes:

(1) applying a first set of rules to the collection of texts to yield a collection of syntactic structures corresponding thereto;
(2) applying a second set of rules to the syntactic structures to produce corresponding logical forms; and
(3) applying a third set of rules to the logical forms to obtain semantic relation structures, said structures including at least one instance of a triple comprising a headword, a semantic relation, and a value.

28. A system comprising:
(a) machine-implemented means for parsing a segment of text to obtain a logical form;
(b) machine-implemented means for extracting from the logical form a semantic relation structure, the semantic relation structure including at least a headword, a semantic relation, and a value;
(c) computer memory defining a lexical knowledge base in which the semantic relation structure associated with the headword is stored; and
(d) means for augmenting the lexical knowledge base including means for:
(1) inverting the semantic relation structure; and
(2) storing, in association with the value, the inverted semantic relation structure.

29. The system of claim 28 in which:

the value of the extracted semantic relation structure includes a primary value term, a lower level relation, and a lower level value term; and the means for augmenting includes means for storing in association with the primary value term the inverted semantic relation structure, said stored inverted semantic relation structure including the lower level relation and the lower level value term.

30. The apparatus of claim 28 in which the parsing means is a broad coverage parser.

* * * * *

UNITED STATES PATENT AND TRADEMARK OFFICE
CERTIFICATE OF CORRECTION

| | |
|---|---|
| PATENT NO. | : 7,383,169 B1 |
| APPLICATION NO. | : 08/227247 |
| DATED | : June 3, 2008 |
| INVENTOR(S) | : Lucretia H. Vanderwende et al. |

It is certified that error appears in the above-identified patent and that said Letters Patent is hereby corrected as shown below:

In Title page, in field (54), under "Title" column 1, lines 1-2, delete "METHOD AND SYSTEM FOR COMPILING A LEXICAL KNOWLEDGE BASE" and insert -- METHOD AND SYSTEM FOR COMPILING A LEXICAL KNOWLEDGE BASE USING BACKWARDS-LINKING NATURAL LANGUAGE PROCESSING --, therefor.

In column 1, lines 1-2, delete "METHOD AND SYSTEM FOR COMPILING A LEXICAL KNOWLEDGE BASE" and insert -- METHOD AND SYSTEM FOR COMPILING A LEXICAL KNOWLEDGE BASE USING BACKWARDS-LINKING NATURAL LANGUAGE PROCESSING --, therefor.

In column 4, line 25, delete "FIG. 6" and insert -- FIG. 5 --, therefor.

In column 4, line 29, below "network." insert -- FIG. 8 is a structural diagram in accordance with one embodiment of the present invention --.

Signed and Sealed this
Nineteenth Day of April, 2011

David J. Kappos
*Director of the United States Patent and Trademark Office*